United States Patent
Rosenblatt

(12) 
(10) Patent No.: US 6,711,548 B1
(45) Date of Patent: Mar. 23, 2004

(54) DISTRIBUTED COMPUTER NETWORK AIR TRAVEL SCHEDULING SYSTEM AND METHOD

(76) Inventor: Joel H. Rosenblatt, Mile Marker 24.5, Royal Palm Plaza, Summerland Key, FL (US) 33042

( * ) Notice: Subject to any disclaimer, the term of this patent is extended or adjusted under 35 U.S.C. 154(b) by 0 days.

(21) Appl. No.: 09/473,687

(22) Filed: Dec. 29, 1999

(51) Int. Cl.$^7$ ............................................. G06F 17/60
(52) U.S. Cl. ............................................. 705/6; 705/5
(58) Field of Search ............................... 705/5, 6, 7, 8, 705/9, 10, 22

(56) References Cited

PUBLICATIONS

Screenshots from FlightTime website, obtained from www.FlightTime.com, 1985.*
"What Industry Isn't On–Line These Days?", article published in San Franciso Business Times, Apr. 24, 1998.*
"Booking a Flight on the Internet", article published in the San Francisco Chronicle, Sep. 30, 1997.*
"AirCharterNet Closes DEal with Microsoft Expedia.com Travel Site", article on Business Wire, Jan. 28, 1998.*

* cited by examiner

*Primary Examiner*—Sam Rimell
(74) *Attorney, Agent, or Firm*—Jacobson Holman PLLC

(57) ABSTRACT

An air travel scheduling system and method for making charter-type flight scheduling available to the general public on a readily accessible and reasonable-cost basis. Individuals wanting to travel to, from or between non-hub cities can arrange, through a directory service web site on a distributed computer system, an individualized flight itinerary between specified locations. The directory service has a listing of a wide range of aircraft types and sizes currently available through fixed base operators. Based on factors which may include the booking traveler's point of origin, destination and number of passengers, the directory service assigns a most appropriate aircraft to satisfy the traveler's flight requirements in the most direct and cost-effective manner.

9 Claims, 2 Drawing Sheets

DISTRIBUTED COMPUTER NETWORK AIR TRAVEL SCHEDULING SYSTEM AND METHOD

BACKGROUND OF THE INVENTION

1. Field of the Invention

The present invention is related to the field of airline travel and, more particularly, to an air travel flight scheduling system best accessed using a distributed computer network.

2. Description of the Related Art

Airlines evolved historically in a pattern reflecting pursuit of the largest identifiable market areas, i.e., the largest population centers from which the greatest number of potential air-travelers might be drawn. This resulted in creation of an airline system containing major "hubs" at major cities. In the process, airlines developed a similar form to that of the railroad industry where major rail heads and ports were interconnected by surface rail lines. Population concentrations had developed along routes where rail service became available. Rail lines attracted people and people attracted rail services.

Nevertheless, unlike railroads, aircraft are not confined to a road bed in choosing routes. They can fly a straight line from anywhere to anyplace. The economics of operating aircraft are highly sensitive to economy of scale. The larger the aircraft, the more economical its cost per passenger mile delivered. That results from a combination of both fuel economy and flight personnel required per passenger. However, to achieve that economy, these larger aircraft must fly with most of those seats occupied.

Flights between major hub airports offer greatest access to the largest pools of potential airline passengers. The greatest competitive pressures between airlines focus on obtaining rights to serve major hub locations.

While early evolution of these hub locations largely followed the locations of urban concentrations formed around rail heads and harbors, over decades a substantial portion of the population has become more widely dispersed as a result of the availability of highway transportation. Tens of millions of people live in communities that are neither rail heads nor hub airport locations. To serve these smaller cities, a system of "feeder" airlines developed. The principal orientation of feeder airlines generally involve connection between smaller communities and one of the established hub airports; for connections to other hub airports, and from which additional connections from a second hub airport to smaller communities could be made via additional feeder airlines.

Underlying all this development was orientation toward getting the maximum number of people on the largest aircraft available, with sufficient scheduled flight frequencies to provide a choice of timetables for accomplishing a given flight and making needed connections in a reasonable waiting time.

Speed of travel is the dominant attraction. Jet aircraft fly at twice the speed of prop driven aircraft. Arrival of the jet engine signaled the end to further development of larger prop driven aircraft. Most of that occurred before the advent of OPEC. Fuel efficiency was not as significant as speed, or labor. Since OPEC, fuel efficiency has also become a dominant concern.

Unfortunately, jet aircraft are only fuel efficient flying at high altitude and high speeds. During take-offs, landing, and taxiing, jet engines are notorious fuel "guzzlers". On shorter haul flights, much of their operation occurs climbing to altitude, descending, and taxiing on the ground—all at low altitudes and slower speeds. In high air traffic density areas such as hub airports, additional time is spent "stacked up" at slow speeds waiting for clearance to land, and waiting in long queues lined up on a taxiway for clearance to take off, with engines idling.

Passengers desiring to fly from anywhere in Georgia to anywhere in the rest of the country must fly to Atlanta first. Passengers desiring to fly from anywhere in Ohio, southern Illinois, or Indiana to practically anywhere else in the country must first fly to Chicago. In the entire north central states region, travelers must fly to Milwaukee to get anywhere else. In addition to those for whom both origin and destination is someplace other than the locus of a hub airport, even those whose origin or destination is a hub airport still encounter half the waste travel and transfer flight delay time of those who must face it at both ends of a trip. As a result, on many trips, passengers must travel substantially longer total airline distances than the actual "line-of-flight" distance from the point of origin to the destination intended by the traveler. For example, to fly from Columbus, Ga. to Savannah, one must fly to Atlanta, and change planes for a second flight to Savannah. Each of these two flights is about the same distance as a direct flight from Colombus to Savannah.

More recently, major airline traffic losses have resulted from the number of passengers now taking advantage of short haul travel offered between smaller cities at lower fares, and at lower operating costs to airlines furnishing these services, using smaller aircraft. These smaller aircraft operators, often carrying 20–30 passengers, have already become large airlines themselves. They are still operating scheduled point-to-point travel services.

A survey of passengers arriving at hub airports would probably indicate that use of hub airports, as transfer points rather than trip destinations, is responsible for much of the air traffic congestion at hub airports. Air traffic congestion directly contributes to fuel wastage, both from time spent in holding patterns in the air while landing traffic clears, to time spent holding in long lines on the ground, with engines idling, awaiting take-off clearance.

For many passengers, itineraries require flying much farther than the airline mileage represented by "airline distance" from point of origin to intended destination. That additional mileage, even at jet transport speeds, is the equivalent or greater than a direct flight at slower speeds in terms of total flying time required. When waiting time at transfer points is added to flying time, average travel time in transit becomes substantially longer.

During Congressional hearings considering the launching of an American supersonic transport development program (SST) detailed analyses of what actually happens on a proposed trans-Atlantic flight trip were evaluated. A typical travel plan in those scenarios started with departure from home or hotel in New York City, a cab ride to Kennedy, check-in time prior to flight time, flight time from New York to Heathrow, customs clearance time in England, cab ride from Heathrow to London hotel or similar in-town destination, plus time spent for meals.

At the time of these hearings, the total elapsed number of hours from the starting point of origin in the first city to the ultimate destination in the second city, plus meal times for the number of meals normally eaten during that interval (whether served aboard the aircraft or eaten on the ground at either end of the trip) indicated that the time saved by use of SST aircraft was scarcely worth the cost and additional environmental problems incumbent to the launch of the program.

Congress did not approve the project. Lack of financial success of the subsequent British/French Concorde development bore out the accuracy of the earlier studies presented to the American Congress.

Obviously, much more is involved in most travel planning time allowances than the actual flying speed of the aircraft suggests.

A rather trivial approach to the concept of matching traveler need to flight options has been instituted by an effort to book luxury corporate jets as luxury travel charters, to allay part of the cost of ownership of luxury aircraft by making use of them when not in service by their owners. Its objective is substantially that of encouraging the purchase of such aircraft by those for whom their personal or corporate travel needs might not justify such ownership. Ownership shares are also being offered in expensive aircraft for those with no need for full time access to the use of such luxury accommodations.

Another approach, offering charter services via the Internet, proposed the use of a six-passenger aircraft in response to a random request for a flight from Key West to Gainesville, Florida for three persons. The price was $3,948. Flying time was one hour, thirty-four minutes. The same trip, offered by a discount booking service via regular airline services, proposed a flight from Key West to Tampa (flight time 1 hour fifteen minutes) followed by a connecting flight from Tampa to Gainesville (additional flying time forty minutes, with only a thirty minute layover to make the connection). Total trip time became two hours twenty-five minutes, for a total price of $754.50. Note that the charter aircraft offered was larger and faster than the trip required. (In response to a request for a charter for three passengers, the most appropriate aircraft selected by the charter booking service was a six-passenger, 225 mph aircraft for a 305 mile trip.) The 305 mile point-to-point distance bore no relationship to the suggested charter price in terms of aircraft operating cost, and nothing suggests where the aircraft was actually based (which might have affected the operating cost for the actual trip anticipated). The "mind-set" of the charter offering image was appeal to the luxury seeker.

A charter broker listing is also offered. This lists brokers world wide who offer to book charters via charter operators, generally on an area-by-area basis. There is obviously no connection between the charter brokers and the operators whose fleets are on call in response to a request from the broker. Many offer to book charters world-wide.

Clearly, none of these are oriented toward enveloping within their service all owners and operators of smaller aircraft or charter services. Nor is there any suggestion of the charter service operators having any association with either the booking agencies or the manufacturers of the aircraft. The new system of the present invention moves personal aviation out of the realm of the "rich man's toy" that originally identified introduction of the ubiquitous automobile into everyday life.

SUMMARY OF THE INVENTION

The distributed computer network air travel scheduling system and method of the present invention represents an entirely new concept of airline flight scheduling that takes full advantage of networked high speed computerized methods of planning, booking, routing, and scheduling of aircraft, of various sizes and performance characteristics, to offer both improved fuel economy and travel times through the elimination of non-productive airline passenger mileage and non-flying travel time.

The advent of the "information age" offers a new opportunity to gather and process information at blinding speeds using current computer technology. The present invention applies that technology to the problem of scheduling air transport in response to user demand as such demand arises.

In view of the foregoing, one object of the present invention is to overcome the difficulties of and inconveniences associated with air travel between non-hub cities by scheduling non-scheduled flights, arranged on-demand and point-to-point.

It is another object of the invention to organize Fixed Base Operators so as to better utilize their aircraft by making such aircraft available to air travelers seeking more direct flight paths from their point of origin to their destination.

A further object of the invention is to provide a less expensive alternative to traditional commercial airline travel for shorter haul flights as well as for travel between cities for which a direct traditional airline flight is unavailable.

A still further object of the invention is to provide flight scheduling in which the airline mileage closely approximates the actual line-of-flight distance from a point of origin to a destination.

Another object of the invention is to provide consumers with a form of air travel offering greater flexibility in scheduling and routing.

An additional object of the invention is the elimination of much of the duplication in the services offered by airlines competing for the same routes for the same reasons, and hence elimination of marginally booked flights.

A further object of the invention is the reduction of non-productive flight congestion at hub airports, with concurrent reduction in air traffic control complexity, as well as elimination of fuel wastage associated with prolonged holding pattern and take-off clearance delays that often result from unnecessary airport traffic congestion.

A still further object of the invention is the ability to employ the most fuel efficient type of aircraft able to supply a trip requirement in the same, or equivalent, travel time.

In accordance with this and other objects, the present invention is directed to a system and method for scheduling non-scheduled flights using a distributed computer network such as the Internet. Fixed Base Operators (FBO's), through subscription to a directory service or similar listing available over the distributed computer network, make their aircraft available to air travelers seeking more direct flight paths and less structured travel between cities which are not primary commercial airline "hub" cities.

Using the method of the present invention, a traveler schedules an individualized flight from a given departure site to a given destination according to personal need. The size of the aircraft to be used to complete the flight is selected from a fleet of various sizes on the basis of the number of passengers booking the flight. If extra space is available, additional passengers are drawn from the public at large in order to best utilize the fixed overhead necessary to complete the flight.

The benefits of the present invention include better use of under-utilized aircraft assets, a closer correlation between aircraft size and number of passengers on many flights, and the elimination of non-productive airline passenger mileage as well as non-flying travel time for certain categories of air travelers.

These together with other objects and advantages which will become subsequently apparent reside in the details of operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In describing a preferred embodiment of the invention, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
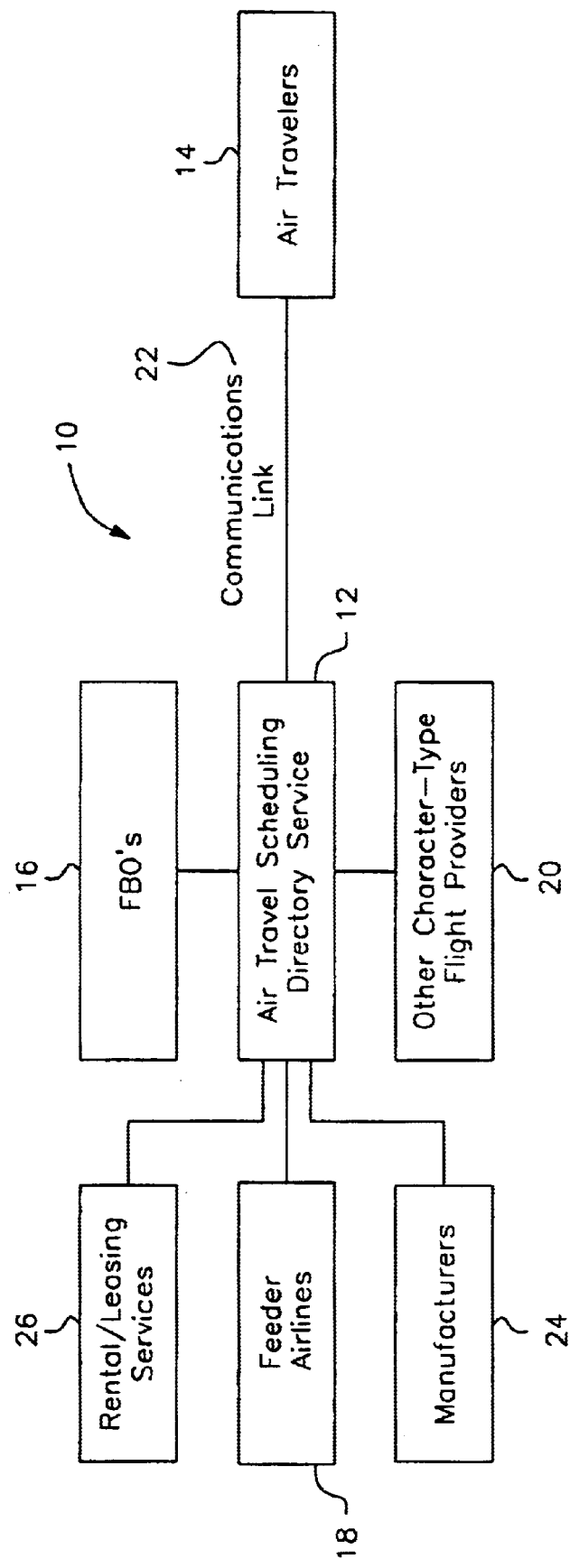
FIG. 1 is a block diagram of the air travel scheduling system of the present invention.

As illustratively shown in FIG. 1, the distributed computer network air travel scheduling system of the present invention, generally designated by the reference numeral 10, serves to connect an air travel scheduling directory service 12 with air travelers 14 who are seeking flight services catered to their itineraries as opposed to traditional flight services geared to suit the convenience of major airlines.

The air travel scheduling directory service 12 is linked to fixed base operators (FBO's) 16, feeder airlines 18, and other charter-type flight providers 20. The directory service 12 may also be linked to aircraft rental and leasing services 26, as well as airline manufacturers 24 as such entities become involved with or available to the type of travel being arranged through the directory service 12. Air travelers 14 contact the directory service 12 over a communications link 22 which, in the preferred embodiment, is an on-line connection via a distributed computer network such as the Internet, e.g, "point-to-point-flight.com". Alternatively, the communications link 22 may be embodied as a traditional voice telephone connection.

Air travelers 14, by accessing the directory service 12, are able to specify precisely what they need in terms of destination and point of origin, and to have those needs met by any one of a wide range of small to mid-size aircraft flight providers. Most airlines offer reduced rates for booking flights well in advance of intended trip dates, and many air travelers have indicated not only willingness to avail themselves of that opportunity, but the ability to adapt travel planning to take advantage of such opportunities. The present invention provides far more than simply reduced rates through long-term planning. The present invention offers custom itineraries through an efficient matching of aircraft resources with passenger needs.

In accordance with the present invention, an amount of lead time on bookings is sufficient to permit assembling enough passengers, along a route reflecting passenger requests, to permit allocation of the most appropriately sized aircraft for that number of passengers, from a fleet of various sizes, each of which represents an optimum economic size for the number of passengers. Each can make the trip in less total travel time than is commonly consumed flying all over the sky before arriving at an intended destination after leaving a point of embarkation, together with layover time consumed in terminal buildings waiting for connecting flights; check-in time in advance of scheduled flight times; waiting in long queues to accomplish the check-in on large aircraft flights; boarding procedures; long baggage recovery times when a hundred passengers who disembarked simultaneously at a given destination are waiting for baggage, etc.

Figure 2:
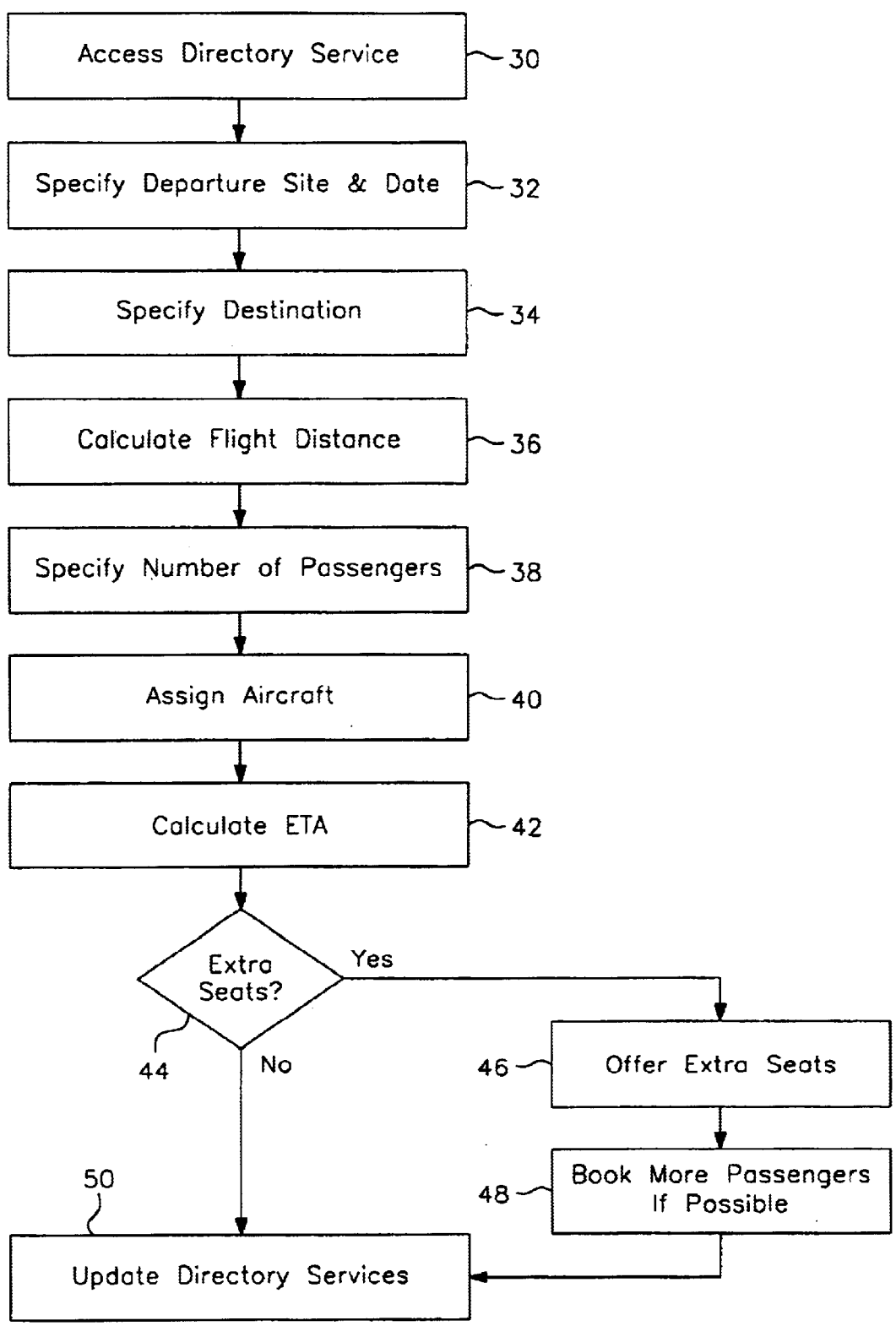
FIG. 2 is a flowchart of the air travel scheduling method of the present invention.

The method of the present invention is representatively depicted in FIG. 2. An air traveler 14 wishing to schedule a flight first accesses 30 the air travel scheduling directory service 12. Such access may be via a computer connection or a standard voice telephone line.

Once the directory service 12 has been accessed, the traveler 14 specifies 32 a departure site and date, and also specifies 34 a destination. The directory service 12 calculates 36 a flight distance between the specified departure site and the specified destination. The traveler also specifies 38 the number of passengers for which such travel is desired.

The directory service 12 then assigns 40 an aircraft for the requested flight. The aircraft to be assigned is most typically selected on the basis of the distance to be traveled and/or the number of passengers. Aircraft assignment may also take into consideration the location of particular aircraft on the specified departure date. For example, if the most appropriate aircraft in terms of size is scheduled to be located in New York on the date that the traveler wishes to leave from California, another aircraft already scheduled to be located in California on that departure date may be assigned instead.

Once an aircraft has been assigned 40, the directory service calculates 42 the estimated time of arrival of the flight at the destination. The estimated time of arrival (ETA) is calculated on the basis of the cruising speed of the assigned aircraft and the distance to be traveled. This ETA is provided to the traveler reserving the flight, and is also posted to the directory service listing. The directory service listing maintains a current and scheduled location of all the aircraft available through such service. By updating the listing with every reservation, future reservations can be more efficiently made by taking into consideration the scheduled location of each aircraft upon completion of previous flights.

Since the number of passengers may be less than the aircraft's capacity, the directory service compares the seating capacity of the assigned aircraft with the passenger booking total to determine if extra seats 44 are available. If no additional seats are available 44, the directory service updates 50 its flight and aircraft availability listing to reflect the scheduled flight, including point of origin and date of departure, destination and aircraft assigned to the flight.

If extra seats are available, the directory service posts such information to offer 46 the extra seats to the general public. Such posting may be via the directory service web site or other appropriate means, and most typically includes the flight information, number of seats, and pricing information.

If possible, more passengers are booked 48 in order to offset the fixed costs associated with operating the aircraft to complete the scheduled flight. As more passengers are booked, the directory service updates 50 its listing to indicate the remaining number of seats.

In order to more fully book a particular flight, the aircraft may be routed to include intermediary stops if appropriate. Routing may not only involve delivering some passengers along the way, but picking others up as well. All would be notified in advance of their proposed schedule as soon as the flight had been booked. Once this sort of customized charter flight has been booked, its flight plan is filed with the FAA in the same manner as that followed by general aviation users of air space. The "niche" market targeted, with origins and destinations at other than hub airports, minimizes ATC coordination problems associated with fitting flights into already congested airspace.

In a worst case scenario, alternative routing, via scheduled air routes and airlines, may be used as the fall back position for making a booking if enough trip demand does not develop in time to assemble a customized route booking. As the system grows, however, the fleet of available aircraft will enlarge to include a wider range of-aircraft capacities as well as new aircraft specifically planned for the service as set forth in the present invention. As more people avail themselves of the service, the need for resort to scheduled carrier fall-back positions will recede. Initial experience will also suggest the cost/benefit relationship break-point at which assembly of a larger group is needed to offer the service at price-competitive rates with existing airline alternatives, including evaluation of the premium many travelers might pay for the convenience, i.e., the point at which charter booking costs become attractive even if only two or four passenger aircraft are available.

It is probable that after having the benefit of experience in application, several new frequently used routes will develop sufficiently to anticipate the need for providing them, even in advance of their being booked and deploying the largest available aircraft for bookings on those routes. Many routes will evolve as regular new routes, the present need for which might not even be suspected. They might not be daily, but could well be regular. The benefit offered by the present invention is that timing their departures is no longer dependent upon coordinating them with connecting flights. Hence, the target market is not the "frequent flyer". It is the "infrequent flyer".

There are hundreds of existing fixed base operators at virtually every small airport in the United States who maintain a variety of aircraft of varying capabilities, capacities, cruising ranges, and flying speeds. All are FAA certified to offer the service, and all carry insurance.

Each of these independent charter services may have its own cost structures that govern its charges for charter flights. These must also be derivative from total flying hours experienced, contributing to support of annual fixed costs for many of the same reasons that economy of scale demands that large aircraft attain maximum bookings to realize their presumed cost effectiveness. With no need for dealing with travel agency commissions or fixed annual costs of manning leased airport terminal floor space, the new network service of the present invention may be organized by assembling a database of all existing charter service operators, per passenger or per flying hour, to be kept currently upgraded with availability data (out-of-service, current bookings, red-lines for maintenance, etc.) in a "point-to-point-flight.com" data base.

A lower hourly charter flight rate for hours booked annually via "point-to-point-flight.com" would be a reasonable anticipation for a system that minimizes many of the non-flying hourly costs currently experienced by charter flight operators. Payments might be made to the charter flight operator by the network booking agency on the basis of the alternative scales for network charter bookings less server commissions. Airline distance for any flight request lends itself to instant calculation through use of the GPS (Global Positioning System) coordinates for over 5,000 "public access", plus another several hundred privately owned, airports in the country. Their locations, by latitude and longitude, are published by organizations serving the private pilot market. That distance, divided by the cruising speed of the charter plane available, supplies both departure time and estimated time of arrival (ETA) to the traveler booking the charter, and simultaneously notifies the equipment operator.

That entry also automatically places the booked aircraft in a new location at a given time in the data bank for booking another flight to another location from the original flight destination, for a departure some time later than the original flight ETA, if a request is received for it within the booking lead time. All such "double bookings" terminating at a location closer to the original point of departure than the original destination reduce the dead cost of empty return flights, and/or make one empty return cost for two bookings.

Charges might be established by the operator based on a sliding scale depending on his ratio of "dead" time on the ground to total flying time booked. A variety of permutations may be formulated for arriving at ticket pricing in establishing the system. All should be substantially less than existing charges for one way flights with an empty return, interspersed with a greater number of days of sitting on the ground with fixed annual costs. Less complex charge systems might simply be established for use of the service in a form similar to other pay-for-use network services. While the value of the service received might not be related to "connect time" costs, they might be related to flight distance booked at the carrier's hourly flying time rates.

In the course of getting all these charter services linked to the Internet via their primary business activity (booking charter flights), many fixed base operators not currently "on line" may also find use of network services beneficial for other business purposes (e-mail, etc.). In concert with local advertising by the charter service operator, with the appeal of lower hourly charges and minimizing non-flying costs, the participating charter service supplier may well experience a substantial influx of new business opportunity in a market beyond his previous capacity to penetrate or develop.

It is reasonable to assume that charter service operators already have some sort of computer and facsimile equipment for use in their business, whether they make use of network access or not. For those not already "on line", a small software program might be distributed to them which is narrowly developed to only provide direct access to the host supplying the service, with appropriate security encoding as a further security detail, protecting against virus/hacker bookings. The networking activity is only needed for the scheduling and booking activities.

Access to the general public may be instituted through a 1-800 number (vis-a-vis 1-800-AIRTRIP), with the resulting charges for the booking appearing on the user's credit card bill, and including a call-back confirmation routine as a further nuisance hacker security measure. Booking a flight becomes as user friendly as calling a travel agent or an airline for a ticket reservation. Physical ticket processing may be by mail or at the delivering charter service.

Demand for a number of flights between two points requiring aircraft larger than those commonly operated by fixed base charter services can be met using equipment supplied by operators of small feeder airline services 18, who also make equipment available for charter, previously oriented toward organizational charters for passenger groups assembled by others. Regular feeder airlines providing such services may also find that some of their less well-traveled scheduled routes may be more economically abandoned as scheduled obligatory services, to be more favorably replaced by non-scheduled services via "point-to-point-flight.com". They would still get full flight bookings on days of the week that actually pay for days on which they otherwise fly half empty.

Marketing of the service and its derivatives may be expanded as desired, but the concept system alone targets an adequate market without becoming concerned with the ability to solve all travel problems. The "niche" it readily fits is market enough for profitable operations without going near hub airports.

The new system, once launched, could open entire new forms of airline business. In concept, it is not dependent on tying up terminal facilities; requires no baggage rehandling en route; permits decentralizing airport facilities; eliminates empty return or layover costs of charter flight services; and relieves the air traffic control system of its most vexing problems, some being exacerbated by airport extension programs currently underway. (Enlarging airport ground facilities does not enlarge the airspace.)

Such a self-optimizing system would make nearly the same access to the national air transport system available to serve cities with less than 20,000 populations as is now only available to those with more than 2,000,000. But that aggregate of small-city populations is enormous. The United States population is much larger than the sum of all populations located in hub airport cities.

Contrasting the effects of use of a 180-mph aircraft with a 500+mph aircraft for a simple 500-mile trip (point of origin to point of destination) may illustrate the fact that little or no time consumption sacrifice (speed of travel) for the traveler is involved:

| | | | |
|---|---|---|---|
| a. Actual flight time: @500 mph | = 1.0 hours; | @180 mph = | 2.78 hours |
| b. Min. advance check-in time* | = 0.5 hours | > | 0.1 hours |
| c. Checked baggage claiming | = 0.5 hours | > | 0.1 hours |
| Total elapsed trip time | = 2.0 hours | > | 2.98 hours |

*A euphemism if a large aircraft is involved. Commonly, 30 minutes may be spent in a queue waiting to check in at the counter on a flight boarding 100 passengers, with another half hour of boarding procedures before actual aircraft departure time. Realizing the more likely number is at least one hour, the jet time becomes 2.5 hours.

The aircraft with a flying speed advantage of 177% only effected a travel time improvement of 49%. Using the more realistic versus the euphemistic time allowance cited, the differential becomes only 19%. That difference is grossly worsened for trips requiring only one intermediate connection, local origin to hub connection to hub destination. As can be seen, making a single intermediate connection wipes out the remaining time advantage. On most such itineraries, layover time at intermediate connection points exceeds the minimum one hour required to book the connection reservations (another euphemism). Were the situation one involving a trip with both "local origin" and "local destination", travel time advantage actually favors point-to-point flight in slower aircraft (vis-a-vis a second layover allowance or even a hub-to-hub transfer en route). For trips of less than 500 miles, the jet speed advantage also drops rapidly when discounted for ascent and descent flying speeds.

Slower aircraft, booked more nearly to capacity, consume far less fuel per passenger mile delivered to get the passenger from their point of origin to their intended destination than do jet aircraft with higher flying speed taking them all over the sky in between. Reclaiming checked baggage from a flight discharging 100 passengers is a far more harrowing experience than that involved when claiming baggage among a group of less than ten standing on the tarmac where the plane comes to a stop.

Booking direct flights on a point-to-point basis also creates an opportunity on shorter flights (less than five hours) to time them to occur between meal times. That eliminates the need to serve meals aloft. Such flight planning also eliminates the need for extra flight attendants to deliver the service. The number of pilots may remain unchanged for larger charter craft. It is possible to offer a "first class" charter booking service which would allow for use of a larger craft with meal service aloft.

Eliminating baggage rehandling, missed baggage transfers, and reduced baggage pilferage, are all additional advantages. Each represents additional cost saving to airline operations. Fewer passengers per flight also reduces the terminal space needed at departure gates, and the number of departure gates to be manned; there are none at the departure facilities of most of the 5,000+general aviation terminals.

Nearly every component of airline operating costs deserves re-evaluation under the suggested new operating mode. There will undoubtedly be some optimum point in trip distance vs. flight speed that will be determined. There will also be some new minimum passenger booking per flight which represents a break-even point for operating cost vs. fare revenue, associated with selection of the aircraft type for a given trip assignment. It is apparent at the outset that optimization cannot be defined in terms of "faster-and-bigger-is-better".

The SST experience illustrated that supersonic speed, even for trans-oceanic flight distances, was not economically advantageous to users. The new point-to-point scheduling capability indicates that even 500+mph, 200-passenger jet aircraft are less than advantageous for flights of less than 1,000 miles, for users whose itineraries are to and from places other than hub airport locations.

While the fuel saving target may only represent an industry consuming 7.5% of America's petroleum demand, it does not warrant ignoring. Nationally, economic transportation benefits might go far beyond the direct fuel savings involved, and would include relief of hub airport ATC congestion; reduction of environmental noise impact concentration; relief of demand for more extensive ground support facilities; and relief of some amount of indirect highway use created by persons making longer trips by automobile because it is still more convenient than utilizing the available air travel connections (not part of the 7.5% aircraft petroleum use data).

In the process of identifying whatever types of aircraft may be more economically suited to the sorts of service evolving, a new market might develop to employ surplus military aircraft manufacturing capacity to supply the civilian marketplace. Defense contractor conversion opportunities could result, of particular advantage in the post-glaznos national economy. Intermediate range and speed aircraft are already an import-supplied commodity.

Manufacturers 24 may also wish to provide services directly in accordance with the present invention. Beech already has an aircraft, the C-26, probably well-suited to the larger community sizes participating in the suggested new type of service. It seems likely that something in the neighborhood of a 10–20 passenger turbo-prop aircraft may become a mainstay of the system for the most economical flights handling the largest volume of non-hub traffic. That size and performance has already been found to be particularly well-suited to military support activities in the absence of global scale conflicts toward which military planning had formerly been oriented (which prompted the C-26 development).

Such aircraft, flight personnel manning them, and ground support personnel required to keep them operational could easily become components of both a military requirement and many civilian functions of the system described. Each also represent civilian employment opportunity for air force personnel in excess of current military needs, but assuring their reserve cadre availability.

Unlike current aircraft marketing methods, under "point-to-point-flight.com" system conditions, the manufacturer 24 themselves might become a new air travel system equipment operator. In such a vertically integrated system, sales expenses (ultimately forming a segment of aircraft capital costs) are eliminated; parts and supplies for aircraft maintenance are an internal activity; factory training of personnel becomes an in-house activity; and with the entire booking system integrated in the total system, there are no remaining conventional airline activities with which an aircraft manufacturer needs to deal. They can become more competitive than a European or South American aircraft supplier, in a market difficult for a non-American-based supplier to penetrate.

Of further significance, in addition to the list of national advantages cited above, the new system relieves the need for current terminal facilities expansion programs at existing hub airport facilities. Creation of perhaps 20,000 jobs in a civilian market is also an apparent economic benefit in replacing military aircraft needs in the aircraft industry.

Key to the suggested new air travel system remains the nation-wide communications network organization embodied as the air travel scheduling directory service 12 necessary to plan and operate the booking system. There are hundreds of existing air charter services 20 operating from small airports all over the country. A host operator of a www.net search engine such as "point-to-point-flight.com" need only assemble the "Aircraft Charter, Rental & Leasing Service" entries in all the telephone directory advertising sections of all the telephone books distributed in the country to set up an initial databank of service suppliers. The rest is a simple programming exercise optimized for either minimum travel time or minimum cost, per the traveler's request.

The entire concept does not lend itself to being judged based on traditional rules-of-thumb that have evolved in the airline industry relating to operating economics. Even the sizing of suitable aircraft, and their FAA licensing requirements (regulations applicable to charter flight operations differ from airline operating requirements), suggests differing operating economic criteria. (That differential became the criterion used by Dr. Ed Lear in defining the size of his Learjet aircraft.)

Data need to be assembled based on the economics of operating "charter services" (flight personnel, cost per operating hour, seat capacity, cruising range, etc.), for different aircraft sizes, leading to projections of ticket prices required and seating capacity required for flights of various distances, and travel times. Detailed analyses of hourly operating costs for each aircraft type and model already exist in the data prepared by aircraft manufacturers to facilitate their sales efforts with fixed base and charter operators. Such information may then be paired with alternative ticket costs via conventional airline services for random pairings of non-hub airport cities, as a first cut at estimating market sizes to be served for a new manufacturer/operator entrant in the field. These may become spin-off concerns to Beech (Raytheon), Fairchild, Cessna (Textron), Piper, Grumman (Northrop), Lockheed (Martin), et al., but need not be concerns of a distributed computer network host. It has already been projected that the 21st century way of doing business will involve leasing everything, cars, homes, etc. It is probable that will also become the way of placing aircraft into service through rental/leasing services 26. In this case, the manufacturers 24 may offer leases to fixed base operators 16 and/or become the operators themselves. Textron Financial equipment-lease loans is already in the business.

Existing local charter services 20 become the start-up fleet, by joining the booking network 10. Existing charter services, as currently operated, face a series of diseconomies in operating costs to users of their services. Typically, a charter for a flight to or from an outlying destination is encumbered with additional costs not related to the process of taking a passenger to an intended destination with a subsequent return flight. For anything more than a few-hour activity at the destination, costs are incurred for:

a. Layover time on the ground (aircraft hours tied up doing nothing);

b. Per diem expenses for the pilot staying overnight in a hotel;

c. The alternative of a "return empty" flight to await the subsequent date for the intended passenger return flight, followed by a second "empty" flight to pick up the passenger after a longer visit of several days.

The new niche market identification process will similarly not be oriented toward frequent flyers, business travel, etc. Increasingly, the Internet and multi-media communications are reducing demand for frequent flyer business as well. The new service is oriented toward infrequent flyers, e.g., vacation travel, family travel, etc., and to serving smaller cities and/or cities with limited access to scheduled airline travel. The obvious potential of doubling annual charter bookings for these existing charter fleets offers the opportunity to increase charter flight profitability while lowering charter flight rates and increasing sales of smaller aircraft.

While the niche market is not small, it requires identification, and quantifying. To minimize conflict with more heavily traveled ATC airways (Victor airways, etc.), consideration might also be given to route selections that lend themselves to routes that avoid heavily traveled ATC airspace, greatly facilitating filing flight plans for non-scheduled flights with a minimum lead time for securing ATC clearance. Designation of heavy traffic hub airports as prohibited origin or destination bookings via the system might be needed in the initial stages of development of the service. This is not a problem since most hub airports are in cities with nearby "executive" airports serving the general aviation market. A fall-back position is also available to the traveler of using a charter flight destination to a smaller airport served by a feeder airline 18 as a means of accessing a feed to an intended destination not meeting the general criteria initially established for the service.

The foregoing descriptions and drawings should be considered as illustrative only of the principles of the invention. The invention may be configured in a variety of configurations and is not limited to the configuration of the preferred embodiment. Therefore, it is not desired to limit the invention to the specific examples disclosed or the exact configuration described. Rather, all suitable modifications and equivalents may be resorted to, falling within the scope of the invention.

What is claimed is:

1. A method of scheduling, by an individual, a charter-type flight on a non-airline aircraft, said non-airline aircraft being drawn from a pool of available aircraft, the method comprising the steps of:

accessing by the individual, through a distributed computer network, a directory'service web site listing available fixed base operators and their aircraft, said directory service including location and availability of a plurality of privately-owned aircraft, said plurality of aircraft including aircraft of different sizes and speeds;

specifying, by the individual, a departure site, time and date, and a destination;

specifying, by the individual, a number of passengers for booking on the flight;

assigning, by the directory service, an aircraft from the plurality of aircraft to the flight;

updating the directory service listing with scheduled flight information including the aircraft assigned, the departure site, time and date, and the destination;

determining, by the directory service, whether additional seats are available on the flight; and posting, responsive to additional seats being available, information on the flight to the directory service web site, said information including departure site, time and date, destination, aircraft assigned, and number of seats available to other persons.

2. The method as set forth in claim 1, the step of assigning including the steps of:

calculating, by the directory service, a distance to be traveled in direct flight from the departure site to the destination; and assigning an aircraft based on the distance to be traveled and the number of passengers.

3. The method as set forth in claim 2, further comprising the steps of:

calculating, by the directory service, an estimated time of availability of the assigned aircraft at the destination site for subsequent charter flight booking from a cruising speed of the assigned aircraft, the departure time and the distance; and posting to the distributed computer network directory service the estimated time at which said assigned aircraft will be available at said destination for subsequent charter booking.

4. The method as set forth in claim 1, the step of assigning including the steps of:

matching said site of departure with aircraft previously scheduled to be located at said site of departure on said date of departure; and assigning an aircraft based on previously scheduled aircraft location and the number of passengers.

5. The method as set forth in claim 1, wherein at least one of the departure site and the destination is a non-hub location such that a direct and non-stop flight therebetween is not available on a traditional commercial airline flight.

6. The method as set forth in claim 1, further comprising the step of booking, through said distributed computer network in response to said step of posting, at least one additional passenger on the assigned aircraft.

7. The method as set forth in claim 6, further comprising the step of routing the scheduled flight, in response to a request by the additional passenger, to include an intermediary stop between the departure site and the destination.

8. The method as set forth in claim 3, further comprising the step of:

double-booking, through said directory service, a subsequent charter flight for said assigned aircraft beginning at said destination and traveling to another location closer to said departure site than said destination, said double-booking reducing a dead cost of empty return flights to said departure site.

9. The method as set forth in claim 8, further comprising the step of:

adjusting ticket pricing on a sliding scale depending on a ratio of said dead cost to total flying time booked.

* * * * *